United States Patent
James

(10) Patent No.: US 7,051,157 B2
(45) Date of Patent: May 23, 2006

(54) MEMORY DEVICE WITH APPLICATIONS SOFTWARE FOR RELEASABLE CONNECTION TO A HOST COMPUTER

(76) Inventor: Barry Edmund James, 297 Carter Knowle Road, Sheffield S11 9FY (GB)

(*) Notice: Subject to any disclaimer, the term of this patent is extended or adjusted under 35 U.S.C. 154(b) by 255 days.

(21) Appl. No.: 10/388,210

(22) Filed: Mar. 12, 2003

(65) Prior Publication Data

US 2003/0212862 A1 Nov. 13, 2003

(30) Foreign Application Priority Data

Mar. 12, 2002 (GB) ................................. 0205751

(51) Int. Cl.
*G06F 12/00* (2006.01)
(52) U.S. Cl. .................. 711/115; 711/103; 711/162
(58) Field of Classification Search ............... 711/103, 711/163, 164, 170, 115, 162; 712/182–186; 707/1, 10; 713/193
See application file for complete search history.

(56) References Cited

U.S. PATENT DOCUMENTS

| | | | |
|---|---|---|---|
| 4,777,590 A | | 10/1988 | Durkos et al. |
| 4,993,068 A | * | 2/1991 | Piosenka et al. ............ 713/186 |
| 5,522,049 A | * | 5/1996 | Kimura et al. ............. 710/301 |
| 5,581,763 A | | 12/1996 | Hait ............................ 395/186 |
| 6,105,148 A | | 8/2000 | Chung et al. |
| 6,177,957 B1 | | 1/2001 | Anderson ................... 348/231 |
| 6,374,328 B1 | | 4/2002 | Rhinehart ................... 711/115 |
| 6,748,537 B1 | * | 6/2004 | Hughes ...................... 713/193 |
| 6,795,966 B1 | * | 9/2004 | Lim et al. ...................... 718/1 |
| 2002/0095416 A1 | * | 7/2002 | Schwols ....................... 707/10 |
| 2002/0147912 A1 | * | 10/2002 | Shmueli et al. ............. 713/182 |
| 2003/0115415 A1 | * | 6/2003 | Want et al. ................. 711/115 |
| 2003/0212862 A1 | * | 11/2003 | James ........................ 711/115 |
| 2004/0220899 A1 | * | 11/2004 | Barney et al. ................. 707/1 |

FOREIGN PATENT DOCUMENTS

| | | | |
|---|---|---|---|
| EP | 0 516 993 | * | 12/1992 |
| EP | 0 679 983 | | 11/1995 |
| EP | 0 681 297 | | 11/1998 |
| EP | 0 910 016 | | 4/1999 |
| EP | 1 072 976 | | 1/2001 |
| EP | 1 232 776 | | 8/2002 |
| FR | 2 801 990 | | 6/2001 |
| GB | 2 291 991 | | 2/1996 |
| JP | 11-219285 | | 10/1998 |
| WO | WO 00/34891 | | 6/2000 |
| WO | WO 00/67132 | | 11/2000 |
| WO | WO 03/003220 | * | 1/2003 |
| WO | WO 03/12657 | | 2/2003 |

* cited by examiner

*Primary Examiner*—Pierre-Michel Bataille
(74) *Attorney, Agent, or Firm*—Sheridan Ross P.C.

(57) ABSTRACT

There is disclosed a memory device that is releasably connectable to a computer, and which contains at least one applications software package and associated data. Upon connection to the computer, the applications software package runs directly from the device without being uploaded or installed on the computer. In this way, a user of the device may work on any compatible computer using his or her preferred applications software packages and data, without having to configure the computer or install any particular software or data.

2 Claims, No Drawings

MEMORY DEVICE WITH APPLICATIONS SOFTWARE FOR RELEASABLE CONNECTION TO A HOST COMPUTER

The present invention relates, among other aspects, to a memory device for releasable connection to a host a computer and methods for the use thereof, and in particular to a memory device adapted to provide fully portable application functionality which may be tailored for use by a particular individual or for a particular task.

Traditionally, when seeking to transfer data and application software from one personal computer to another, it has been necessary to download the data and application software from the first computer onto a portable storage medium such as a floppy disk or CD-ROM or the like, and then to upload the data and software from the storage medium into the second computer by way of a floppy drive or CD-ROM drive. The application software then needs to be reinstalled and reconfigured on the second computer. This solution is relatively secure, in that the data is physically held in the data storage medium and cannot be accessed by a third party unless the third party comes into possession of the disks or the like. However, it can be slow to download a large amount of information onto disk, and a large number of disks may be required to store a large amount of data. Furthermore, the process of reinstalling and reconfiguring the application software on the second computer is often both time-consuming and may require skills beyond those of a typical user or operator, therefore requiring expert assistance and additional cost.

Alternatively, data and applications may be transferred by way of modems and a telecommunications network. This solution, however, is relatively insecure, since the data may be intercepted by a third party when the data is passing from one computer to another. Various encryption techniques are known which may reduce this problem, but none are fully secure and many can be broken by a dedicated hacker. In any case, this method of transfer can be extremely slow, and does not solve the problems of reinstallation and reconfiguration of the applications software on the second computer.

There has recently been developed a portable memory device for attachment to a personal computer, for example by way of a Universal Serial Bus (USB) or other port (see www.pendrive.com for an example of a subtype of this type of device), into which data stored in the computer's RAM or on its hard drive may be downloaded. The device may then be removed from the USB port, carried physically to another computer, plugged into the other computer's USB port and then activated to upload the data. The device does not generally require prior software installation on most computers, and comes with various storage capacities in the form of a non-volatile flash memory, for example. This solution provides for quicker downloads and uploads than disks, and is secure in that the data stored in the memory cannot be accessed by a third party without access to the device itself. WO 01/23987, the full disclosure of which is hereby incorporated into the present application by reference, describes a more sophisticated USB flash memory drive of this type which is provided with a simple on-board memory management system separate from that of any computer to which it is temporarily attached. Nevertheless, this device still requires applications data and the like to be uploaded from the flash memory to the host computer.

However, although useful for transferring simple data, for example a written document or a database and its contents, from computer to computer, the devices described above are limited by the current dogma in computer systems architecture that a personal computer consists of an integrated unit comprising a Central Processing Unit (CPU) at its heart, with peripheral building blocks such as RAM, disk drives, monitors, printers, application software and the like being arranged around the CPU. Accordingly, any particular personal computer is individually configured for a given user or users, and the user identity is found throughout the personal computer in the form of stored data, applications, personal settings and the like. Although a user may easily take a given amount of data (e.g. a document, spreadsheet or picture) from his own computer, upload it into another computer, and work on the data on the other computer (provided that the appropriate applications software is installed), the full functionality of the user's own computer is not transferred. Furthermore, data thus stored on the receiving computer by the main user thereof may not be safe from unauthorised access by a third party later using that computer. Additionally, in the event that a user of a computer leaves that computer unattended and/or unsecured, the data and applications on that computer may become available to an unauthorised third party who may interfere therewith in the absence of the authorised user.

It is known to provide computer game systems comprising a main console and interchangeable games cartridges. In general, each cartridge contains an MPROM or the like programmed with games software. However, such cartridges are specific to particular games consoles and may not be used interchangeably between different systems. Furthermore, the MPROM memories in such cartridges are read-only devices, and do not allow for a two-way exchange of data between the console and the cartridge. EP0681297 discloses a more sophisticated computer game system comprising rewritable flash memory cartridges onto which different games software may be downloaded, for example at retail outlets or for rental. These flash memory cartridges may be configured to store player high scores and similar pieces of data generated by the hardware of the games console, and as such do provide a limited two-way exchange of data between the console and the cartridge. However, it is to be appreciated that these games cartridges do not hold all of the applications software necessary to run or play a given game. The bulk of the graphics and sound processing software required for playing a game is actually held in ROM in the main console. This is one of the reasons that games cartridges are not freely interchangeable between different console systems, because each different console has different graphics and sound capabilities, and thus requires different games software.

An interesting variation on the games console/cartridge approach is known from EP1232776, where there is disclosed a smart card for collecting loyalty points as part of a customer loyalty programme as is commonly offered by supermarkets and the like. In addition to a customer being awarded loyalty points relating to a value of goods purchased, including special promotions where extra points are awarded for individual product lines, the smart card of this disclosure includes gaming software allowing a user to play a game in exchange for a predetermined number of loyalty points and also to receive additional loyalty points in the event of winning or successfully executing the game. However, as with the system described above, the games software held on the smart card is not complete, and needs to be complemented by various pieces of dedicated software held on a gaming terminal or home PC.

Finally, it is known from U.S. Pat. No. 6,177,957 to provide a digital camera including a memory with a built-in baseline application program. Additional applications software products may be stored on removable memory devices adapted for releasable attachment to the digital camera. The removable memory devices may be "hot-mounted" in an appropriate slot of the camera and applications software stored in the removable memory device may then be accessed by way of a menu in a display of the camera. However, it is important to appreciate that each time a software application on the removable memory device is selected for execution, the application is uploaded from the removable memory device into a DRAM forming a permanent part of the architecture of the digital camera electronics, and thus does not run direct from the removable memory device. Furthermore, the camera acts as a host, with the removable memory device (which is a dedicated device) serving to add software to the camera electronics, and thus to enhance the functionality of the camera.

Embodiments of the present invention seek to provide a radical shift in the central dogma outlined above, thereby providing surprising advantages.

According to a first aspect of the present invention, there is provided a method of data processing, wherein at least one applications software package and optional associated data is held on a discrete, non-volatile memory device requiring no processing power, the memory device including means for releasable connection, by way of an I/O port or the like, to a separate host computer having a processor and an operating system, and wherein, upon connection of the memory device to the computer, the applications software package runs from the memory device by making use of the operating system and processor of the host computer in such a way that changes to data as a result of data processing by the processor of the host computer are stored in the memory device, thus enabling the memory device to be disconnected at any time from the host computer without loss of data integrity and without requiring a dedicated shut-down procedure prior to disconnection, and to be reconnected to the same or a different host computer on a subsequent occasion in order to recommence data processing.

According to a second aspect of the present invention, there is provided a discrete, non-volatile memory device requiring no on-board processor and having means for releasable connection by way of an I/O port or the like to a host computer having a processor and an operating system, the memory device containing at least one applications software package and optional associated data, the applications software package being configured to run from the memory device, upon connection thereof to the host computer, by making use of the operating system and processor of the host computer, and wherein the memory device is configured to store changes to data resulting from data processing by the processor of the host computer, thus enabling the memory device to be disconnected at any time from the host computer without loss of data integrity and without requiring a dedicated shut-down procedure prior to disconnection, and to be reconnected to the same or a different host computer on a subsequent occasion in order to recommence data processing.

Preferably, changes to data made as a result of data processing by the processor of the host computer are stored immediately or substantially immediately in the memory device so as to permit "surprise" disconnection of the memory device from the host computer without significant loss of data. In any event, through frequent data flushing and check-pointing, it can be ensured that data integrity, at least within the boundaries of the applications software package, is maintained. This means that after substantially any "surprise" disconnection event, the applications software package will operate reliably (i.e. will not crash) the next time the memory device is connected to the same or a different host computer. Some relatively insignificant loss of data may in some circumstances be unavoidable in the event of a "surprise" disconnection, but advantageously this loss of data is limited to, say, a single transaction or an integral number of transactions rather than a part-completed transaction, which would cause problems upon reconnection of the memory device. In practice, it is preferred that all data changes and transactions are stored or backed-up on the memory device at least every few seconds, preferably at least every second, more preferably at least every hundredth of a second and most preferably at least every millisecond. Naturally, the frequency of data back-up or storage on the memory device to ensure data integrity will depend on the nature of the applications software package being run. Where more than one applications software package is provided on the memory device, which will often be the case, then data integrity must be ensured for the package making the most frequent changes to data, and this will then ensure that all the other applications will maintain integrity.

The discrete, non-volatile memory device is preferably portable, and even more preferably lightweight and small in comparison to the host computer. It may, for example, take the form of a USB drive such as disclosed in WO 01/23987, although it will be appreciated that the memory device of the present invention is distinguished thereover by virtue of the complete applications software systems stored thereon and full "hot-plugability".

The memory device is advantageously configured as a memory device that may be "hot-plugged" to a host computer by way of a USB port or other I/O port, preferably a fast I/O port, or by a wireless (e.g. Bluetooth®, infrared or RF, for example) or any other appropriate releasable connection and which presents itself automatically to the operating system of a host computer as an additional drive, other device or the like.

Embodiments of the present invention seek to run the data and applications software directly from the discrete memory device without undue or unacceptable delay. Although it may theoretically be possible to run applications software directly from a floppy disk or CD-ROM, this process is currently too slow for efficient operation because of memory restrictions and the delays inherent in accessing data stored on a floppy disk or CD-ROM or the like.

It is to be emphasised that embodiments of the present invention provide true cross-platform "hot-plugability", in that data processing may take place on a first host computer of a particular type, the memory device may be disconnected from the first host computer at an arbitrary time without loss of data integrity, and later connected to a second host computer, potentially with a different processor and/or operating system than the first, where data processing can continue from where it left off in the first host computer. For example, where the applications software package is a word processing application, the memory device may be disconnected from the host computer while a user is in the middle of creating a document, without the use having actively to save the document, and upon subsequent reconnection to the same or a different host computer, the word processing application may be relaunched or automatically recommenced and the document will be available, optionally automatically being displayed on screen, with no loss of integrity. In another example, the memory device may be plugged into a USB port on a host computer and a user's customised desktop, complete with all applications, instantly becomes available without the need for an installation process. Similarly, the memory device may be removed from the USB port at any time without requiring a shut-down procedure or the like.

Thus, the host computing environment may be changed at any time while the applications software or software system and its associated data remain intact.

A central feature of the present invention is the relegation of the role of a personal computer or the like to a mere service "shell", providing a CPU, an operating system and accoutrements generally including keyboard, monitor, mouse, printer, modem, soundcard/speakers etc., and with one or more applications software and data packages relating to a given user being stored on a portable memory device as described above. Because all of the applications software and associated data is stored on the portable memory device, a user can easily switch from one computer to another (for example when working at different locations or offices) simply by unplugging the portable memory device from one computer and plugging it into the other, for example by way of a USB or other I/O port. In other words, the portable memory device and applications software stored thereon of embodiments of the present invention is substantially self-contained, requiring only the addition of a service environment provided by a host computer in order for the applications software and other data to be accessed, and to continue to function, with data processing recommencing from where it left off. Thus, when reconnecting the memory device to the same or a different host computer, there is no need to go through a start-up procedure (provided that the processor and operating system of the host computer are already up and running)—the screen presents a task of the applications software as it was when the memory device was most recently disconnected.

An alternative way of viewing embodiments of the present invention is to consider that they provide general purpose, "hot-plugable", applications or software systems that are physically and logically self-contained in a discrete non-volatile memory device. This defines an entirely new programming/software environment and gives the ability physically to modularise an entire software system (and, where desired, its data) and to deliver the software system as a hardware package for releasable connection to any host computer, the hardware package containing the software system being physically, technologically and logically discrete and independent.

The memory device requires no processing power or on-board processor, since it makes use of a host computer's processing power or processor when connected thereto. Accordingly, a software system can be made independent of a processor when not in use, thereby providing significant cost savings and additional flexibility. In other words, the memory device loaded with an applications software package of embodiments of the present invention may serve as a discrete lightweight, cheap and portable "pico-computer" that "borrows" processing power from a processor of a host computer when connected thereto, but does not require an on-board processor when not in use. By way of being fully "hot-plugable", that is, adapted to be connected instantly and at any time to a host computer without necessarily requiring an installation or configuration step, and adapted for instant disconnection from the host computer at any time without loss of data, embodiments of the present invention provide a technologically discrete system bringing the benefits of modularisation without losing the benefits of integration.

In addition to these benefits, embodiments of the present invention mean that complete systems may be delivered in a smaller package than hitherto possible (e.g. less than 10% of the size and/or capacity of a pocket or hand-held computer or less than 1% of the size and/or capacity of a traditional desktop computer), the systems being immediately available in real-time by simple connection to a host computer.

In preferred embodiments, the devices of the present invention may be configured so as to enable substantially cross-platform compatibility, for example with host computers based on Windows®, MacOS X®, Linux, UNIX, MS-DOS and other operating systems. This may be achieved by implementing the applications software and associated data in the memory device in a language such as Java® or the like, and specifically in such a language using a reduced set of assumptions about the operating environment that may or may not be provided by a host computer. It is standard practice in Java® applications to assume a net-centred or client-centred environment in which it is taken for granted that predetermined software and/or hardware applications will be available in every type of host. As a result, many assumptions can be made when programming in Java® for the purpose of cross-platform compatibility. Preferred embodiments of the present invention, on the other hand, make no assumptions as to software applications that may be available on a host computer, thereby anticipating a stripped-down environment. This allows much greater cross-platform capability since the applications are configured to be stored on and run from the memory device itself rather than using applications already stored on a host computer.

Advantageously, embodiments of the present invention are configured to provide self-checking and data integrity. Because the memory device and its applications software know that they are operating in a self-contained environment, they can take responsibility for the integrity of any appropriate data, including that of the applications software itself. This means that an operating system running in the memory device can ensure that all data and the like is secure and fully integrated at all times, thereby allowing the device to be removed from its releasable connection to the host computer at any time without the necessity for a system shut down procedure and without causing significant or damaging loss or corruption of any data. This may be achieved by frequent data flushing and/or check-pointing and the like. In addition, the applications software is preferably customised so that it knows to expect "surprise" disconnections, and therefore runs in such a way as to ensure data integrity and sufficient reliability for the application in question.

As a corollary, it is to be noted that preferred embodiments of the present invention allow true "plug-and-go" functionality. In other words, the memory device (i.e. discrete software system), upon connection to the host computer, provides instant feedback to a user, whether by immediately initiating an application (in the case of a dedicated device) or offering a menu of options or the like (in the case of a general multi-use device) without necessarily requiring any additional action on the part of the user. A mechanism may be defined whereby a selection of actions is configurably tied to the connection or "docking" event. Some actions may require user input/interaction by way of an appropriate user interface, while other, generally background, processes may not require any user input/interaction.

This may be achieved by means of a predetermined software daemon which is supplied via the memory device of the present invention or supplied by some other means (e.g. by way of pre-installation, by way of downloading from an appropriate source, or on a discrete data carrier such as a magnetic or optical disk or the like). The software daemon is mounted or installed on the host computer at or before the first time of connection of the memory device to any given host computer. In other words, the software daemon is mounted or installed at or before initial "registration" of any given memory device and/or any associated applications software package with any given host computer. The software daemon acts as a bridge between the operating system of the host computer and the environment in the memory device (including its stored applications), thus enabling tapping of cycles from the host processor into the hosted system on the memory device (acting effectively as a subsidiary or adjunct operating system).

According to a third aspect of the present invention, there is provided a computer program product comprising a software daemon configured to interface a host computer having a processor and an operating system with a discrete, non-volatile memory device that has a releasable connection to the host computer and which contains an applications software package, wherein the software daemon, when mounted on the host computer, taps cycles from the operating system of the host computer so as to energise the applications software package in the memory device.

The software daemon loads with the operating system of the host computer and runs continuously. The daemon monitors connection and disconnection (docking and undocking) of memory devices. The daemon may generate connection and disconnection events and optionally other events and may configurably trigger and/or host predefined (i.e. statically defined) or dynamically defined processes linked to such events. The daemon may host and control "after the event" temporary data and code for surprise and other disconnection events (where the memory device becomes unavailable before the event is initiated or completed), for example prompting a user to reconnect the memory device briefly to the host after disconnection in order to complete a predetermined task.

Further functions of the daemon may include implementation of security and access control checks before running applications from the memory device. These checks may relate to an identity of a user and may also relate to an identity of a memory device, thus only allowing authorised memory devices to be connected to particular hosts, and also to prevent use of unauthorised memory devices that may be counterfeit or potentially contain harmful applications software including viruses and Trojans. The daemon may also perform integrity-related and housekeeping functions (such as data flushing, integrity checking and rollback, e.g. to a previous checkpoint), as well as mediating access to the memory device (for flushing or ejecting etc.).

The functionality of embodiments of the present invention may be seen as providing an adjunct or subsidiary operating system to any particular operating system or systems already resident on a host computer, whether this be Windows®, MacOS®, Linux®, Unix or any other operating system. The operating system of the host computer is mediated and enabled to play temporary host to the applications in fact hosted on the memory device. In effect, the operating system of the host computer is "borrowed" and made use of in conjunction with any on-board operating system resident on the memory device, thus energising the applications on the memory device.

This can be seen as a creative extension of the platform independence of Java® or the like, thus enabling applications and software systems not just to be written once and then deployed on a variety of different platforms (allowing a choice when software is deployed on to hardware) but also to provide "hot-plugging" between different platforms (allowing a new or different choice of hardware each time an application or software system is used). This is a key benefit of aspects of the present invention, and enables commoditisation of computing power.

Embodiments of the present invention allow a host operating system to energise a subsidiary or adjunct operating system for the purpose of extending the host operating system to the applications software stored on the device.

Furthermore, because the applications software and associated data may run from the portable memory device rather than being copied onto the computer's hard drive or other permanent memory storage means, security is much improved, since potentially confidential or personal information is not copied into the computer's permanent memory storage means leaving it vulnerable to potential access by a subsequent user (even after deletion), as is currently the case when using a computer with pre-installed applications software. It is to be appreciated that, even when a user deletes a file on a traditional computer's hard drive, the data stored magnetically on the hard drive is not normally deleted therefrom until overwritten by different data, which may not take place for quite some time after the file has apparently been deleted. In many cases, deleted data can simply be recovered by using standard operating system and/or commercially-available software tools. By running applications software and accessing data directly from the memory device, embodiments of the present invention overcome this problem, since potentially confidential data is not actually copied onto the computer's hard drive unless it is specifically desired to do so, for example when copying a data file from one memory device to another by way of a stand-alone computer. It will be appreciated that although some operating systems transparently swap blocks of data from RAM to disk as part of their normal operation, data recovery from such a scenario is significantly more difficult than from deleted files, and where security is important, this feature is in any case generally disabled.

It will be appreciated that at least parts of the data and/or applications software will temporarily be copied into the computer's RAM for operation thereon by the processor of the host computer, but that this storage is volatile and non-permanent, and will leave no permanent trace when the host computer is shut down and/or the memory device is disconnected from the computer.

As previously indicated, the present invention reverses the classic assumption that a computer comprises a central CPU and operating system, with integrated components such as applications software and the like, and instead places a user's applications software, associated data and even the user's identity at the centre (within the memory device), relegating the computer to a peripheral service provider. The computer thus becomes peripheral to the data, which is in turn bound to the applications (this can be seen as a progression from the tenets of object-oriented technology). Most personal computers are made up of standard building blocks and perform largely the same functions. The key items that distinguish one computer from another, in use, are: i) a user's data and identity, and ii) a user's applications software packages. If these items can be transferred in their entirety from one computer to another, advantageously in a "plug and go" manner, then the user can effectively take "his" computer with him wherever he goes, merely plugging the memory device into any appropriate computer workstation. Accordingly, a new concept of portability based on identity and memory is thereby realised by the present invention.

This is a significant paradigm shift away from classic computer architecture and operation, and leads to a number of surprising advantages:

i) Much improved portability—only a small portable memory device need be carried by a user in order to take his entire "workbench" or "desktop" (applications and data) wherever he goes, the device potentially being much smaller and more robust than a hand held PC or even a mobile telephone, and requiring no power when not in operation. It is important to appreciate that the software applications and data are stored in the portable memory device, not just a copy of the data.

ii) Improved security—a user has complete control over his own data, which may include medical records, bank records etc. Furthermore, an application and its associated data may be moved from an on-line environment (e.g. a desktop computer with an "always-on" or other Internet connection) to an off-line environment (e.g. a laptop computer with no Internet connection) at any time, without leaving a copy of the application and its data in the on-line environment, thus giving greatly improved protection from "back orifice" or "backdoor" Trojans. These Trojans are programs that can be remotely and covertly installed on an Internet-connected computer by an unauthorised third party through the computer's Internet connection, and which allow the third party to access all data and applications stored on the computer, generally without the knowledge of the authorised operator of the computer.

iii) Improved independence—a user's data is available to him at any time and in any location (provided that at least a stand-alone PC is available). There is no need for an Internet connection or the like in order to access or update the data.

iv) Intuitive operation—because the user's entire "desktop" is carried in the portable memory device, the "desktop" can be presented so as to appear substantially the same on any PC, and the user's preferred versions of software applications are carried with him.

v) Strong authentication—because the portable memory device travels with the user, and may be tied to the user by way of a password or other security arrangement, including biometric arrangements (integrated with the portable memory device or otherwise) such as fingerprint readers and retinal scanners, it can serve as a very strong means of electronic authentication for Internet-based and other applications.

vi) Instant access to Web services—an application stored on the memory device can be or contain an "instant access key" to Web-based services, thus allowing users to connect to any predetermined Web-based service (e.g. Internet banking) simply by connecting or plugging the memory device into any available on-line computer.

A number of further benefits may also be provided. For example, by identifying a portable memory device with a function or role, rather with a specific individual, the following may be achieved:

i) Zero deployment—software applications can be deployed already installed and running. This contrasts with current practice where (particularly in a corporate environment) applications typically have to be "rolled out" with the attendant cost of engineering visits to many sites. Additionally, in a commercial/user environment, take-up of an application is often limited by the ability and willingness of users to navigate the intricacies of installing another application onto an already crowded PC risking possible adverse interactions. Furthermore, take-up of new applications is also deterred by the common industry practice of maintenance contracts being applied on a "guilty until proved innocent" basis, the contracts being automatically rendered void when additional software has been loaded and/or installed.

ii) Badge-of-office/membership applications—membership of a board of directors or a project team or other group often confers status and/or access to information that can easily and intuitively be reflected by handing over a portable memory device containing both information and applications appropriate to the membership, reflecting both status and access (to data and applications) in an electronic form. Traditionally, this requires each application to be notified of a new user. Embodiments of the present invention allow the user's credentials and applications/data to be held in the most logical place—that is, with the user himself.

Although the philosophy behind the present invention runs wholly counter to the direction taken over the past few decades by trends in computing, namely PC portability (e.g. laptop and handheld computers) and "net-centricity" (all data communication by way of the Internet), embodiments of the present invention may be combined with these trends to achieve further surprising benefits.

A portable (e.g. handheld or laptop) computer can be seen as a culmination of a quest for "portable computing" that has now been limited by form-factors dictated by human anatomy. Keypads and screens can only be reduced in size to a given degree before they become difficult to use. Embodiments of the present invention liberate both data and applications from this limitation by making the heart of a computer a portable memory device (which may be at least one or two orders of magnitude smaller than the smallest handheld computer—ultimately even implantable in a human body, powered by way of inductive coupling with an external power source or by way of radiated power from an external power source or by way of an implanted power source and adapted to connect to a computer by way of a wireless communications protocol, e.g. Bluetooth®) which is able to support a full range of facilities in combination with a standard computer which provides services such as a screen, keyboard etc. The memory device may be contained within a biocompatible casing suitable for implantation into a human or animal body, or may be provided with a casing that may be connected to a belt loop or the like, or worn on a user's wrist.

Indeed, memory devices of the present invention may advantageously be combined with or installed in articles such as mobile telephones, personal digital assistants, wrist watches and the like for convenience of use and added functionality for these articles.

Of particular advantage here is that embodiments of the present invention are truly "plug-and-go", self-contained and self-checking. Given a wireless connectivity, a portable memory device of the present invention allows a wearer or user thereof simply to walk up to an ordinary host computer provided with compatible wireless connectivity and to see his or her desktop with associated applications appear automatically on a VDU of the host computer. When the user has finished his or her work, he or she simply walks away from the host computer, with all applications software and associated data and modifications thereto safely and automatically stored in the memory device without leaving any trace on the host computer.

The Internet, by its very nature, is "stateless"—that is, universal and impersonal. Embodiments of the present invention, on the other hand, are "stateful" and personal. Rather than these two concepts being competing philosophies, they are, in fact, highly complementary. Much software engineering has gone into adding a degree of "statefulness" to the Web in order to enable, say, e-commerce applications (where a transaction must be built over multiple stages and a customer positively identified) to be implemented. This approach is by nature a compromise because the Internet does not lend itself to being a secure repository for personal data. The Internet does not "move" with an individual and personal data therefore has to be protected—often at high cost and/or by a third party—from illegal access or attack. Embodiments of the present invention are highly complementary and provide the ability to hold personal (and identity) information in a given, highly portable, place with and under the control of a user.

Further applications of embodiments of the present invention include:

1) Digital signing—a portable memory device as herein described is able to make the process of digital signing far more acceptable and intuitive, thereby overcoming two major hurdles to public acceptance. The portable memory device may contain an application to allow a user to sign, or may even be programmed automatically to sign, data files with an appropriate digital signature without a user having to run a particular signing application, and these files can then be sent to other users without the need for additional signature. This may be combined, transparently, with an e-mail based audit system wherein all documents/signatures are collected at a centrally-held corporate or other repository. This may also be combined with an "e-notary" feature, whereby an independently verifiable time stamp may be associated with a document so as to confer proof of filing or proof of existence on a given date.

2) Personal data vault—files, passwords and other items of data can be held personally in a secure encrypted format by means of a simple "drag and drop" and/or functionally similar mechanism on an appropriate PC, the data vault being stored in the portable memory device and the data vault being a software application stored in and running from the portable memory device. Storage and retrieval of data to and from the data vault is thus intuitive and does not require user knowledge of encryption applications, PKI and/or other relevant technologies.

3) Data vault application programming interface (API)—this allows applications easily to create their own data vault and/or access permitted items within a data vault. In this way, third party applications can request/open a "safety deposit box" (or "account") in the data vault, deposit items for secure storage and retrieve items earlier deposited.

4) Portable personal secure e-mail account—embodiments of the present invention allow intelligent/transparent probing, sensing and selecting of available SMTP or other services from an arbitrary current mount or connection point. E-mail can be sent directly from and to the portable memory device "in-clear" (i.e. unencrypted) without leaving traces on the computer to which the device is attached. By additionally providing appropriate encryption services integrated with the applications on the device, it is also possible to send and receive encrypted e-mail without user intervention—the memory device automatically applying the appropriate PKI/session keys or the like without the need for user intervention. As a result, the data and applications stored within the device are effectively secured.

5) Distributed, secure data collection—by deploying information pages and data entry forms (possibly including hyperlink pointers or the like to Web-based documents) on the portable memory device, it may be configured to act as a (geographically) distributed data entry system that can work off-line as well as on-line. Through the use of onboard data encryption, digital signature and e-mail facilities, this can automatically communicate the collected data back to a central repository where it can be automatically processed (e.g. sorted) without the need for manual intervention. An example is a clinical research application in which doctors or medical practitioners participating in a pharmaceutical field trial are each issued with a personal portable memory device containing full documentation for the trial. Each doctor can acknowledge that the documentation has been read by digitally signing the documentation with an onboard digital signature. Also stored on the device is a full set of encounter and incident sheets to record enrolment of and encounters with patients. Data thus collected may be packaged (for example in XML), digitally signed and transmitted securely (using onboard encryption) back to a central repository or collection point where it can be processed to a database for analysis without the need for re-entry or other further human intervention.

6) Audit tool—a portable memory device may be adapted to scan a preselected list of folders (or folder trees) and/or be triggered by application events. Upon any change being made to a file within the folders (or to data within an application), a copy of the new file or data is sent to a predetermined central repository. Certain parameters (e.g. the location/address of the repository) may be fixed and are unavailable for user change by way of digital signing of certain predetermined configuration parameters (e.g. by an administrator or other central authority). An interlock may be provided by way of which certain applications will refuse to proceed past a predetermined point unless they receive confirmation from the memory device that scanning is active.

7) Auto backup—this is similar to the audit tool described above. Whenever a value/data entry/file is changed, a copy is sent (possibly by way of the Internet or the like) to a central archive.

8) Virtual Private Network (VPN)—by deploying a VPN on a portable memory device of the present invention from which the VPN (and/or its key data and/or passwords and/or shared secrets) can be run directly, a scenario may be created which both greatly increases the security of a VPN client and which makes the VPN much more portable. Depending only on available bandwidth, a user can securely log-on to his corporate or other network from home or elsewhere as easily as from his desktop PC. Alternatively, an existing VPN client may, instead of being installed and run from a hard drive on a PC, be deployed as an install application on a portable memory device, together with all the information needed to establish a VPN connection (e.g. certificates, passphrases, shared secrets, configuration data etc.). The user can then deploy the application/data directly from the device so as to make the VPN connection, and a "sweep" facility provided in the device ensures that data is cleared from a connected PC when the connection is broken and/or the device unplugged and/or the PC is shut down or started up.

9) Portable patient records—the portable memory device may hold both a patient's medical and/or health records as well as an application needed to create/manipulate the records. The device may be held by the patient or his doctor, and the data is thus secure, portable and complete. This is to be contrasted with existing medical records storage systems, where various records are held in disparate locations and it is therefore difficult to collate a complete set of records.

10) e-Lloyd George envelope—traditionally, paper medical patient records are held in a cardboard sleeve known as a Lloyd George envelope adapted to hold many different sizes of paper and other records and to keep them all together for ease of reference and transport. A portable memory device of the present invention may be adapted as an e-Lloyd George envelope by employing XML or similar technology and a predetermined combination of patient identifiers so as to allow the device to contain a repository for any electronic data item provided that an appropriate electronic envelope is used and that a reader is made available centrally to allow viewing and/or export of the enclosed information (enforced by a link being available by way of the Web or the like). The envelope will typically be held on a portable memory device (held either by the patient or the doctor or both), but be capable of easy back-up, transfer or hosting on the Web.

11) Gaming applications—a portable memory device of embodiments of the present application may be contained within a joystick or joypad provided with a hardwire or wireless means of connection to a host computer with a VDU and an Internet connection or the like. Applications software stored in the device may be configured to allow access to computer gaming websites (for downloading games or for interactive Web-based games) and the joystick or joypad, optionally with a keyboard or other inputs, allows the games to be played. Because everything runs from the device, no footprint is left on the host computer. This may be particularly attractive for parents who may wish to allow their children to use a home PC or the like for playing games, but do not wish their children to install memory-consuming games applications and the like on the PC. Furthermore, by configuring the device to allow access only to predetermined websites, the risk of exposure of children to undesirable websites is much reduced. In other words, embodiments of the present invention may allow a child to play with a computer while protecting the computer from the child and vice versa. This applies also to embodiments where the memory device is not contained within a joystick or joypad, and allows a safe desktop environment to be created for a child user.

12) Computer training—a portable memory device of embodiments of the present invention may be preconfigured with applications software adapted to provide interactive training in the use of computers in general and also in the use of particular applications packages. This can provide access to basic services without running any risk of accidental deletion or corruption of applications already installed on a host computer, similar to example 11) above.

Additionally, there are many applications of embodiments of the present invention in fields where user identity and/or verification thereof are important, such as sharetrading or stocktrading, banking and/or security. Indeed, a multitude of further implementations for the present invention will be apparent to the skilled reader.

The preferred features of the invention are applicable to all aspects of the invention and may be used in any possible combination.

Throughout the description and claims of this specification, the words "comprise" and "contain" and variations of the words, for example "comprising" and "comprises", mean "including but not limited to", and are not intended to (and do not) exclude other components, integers, moieties, additives or steps.

The invention claimed is:

1. A method of data processing, wherein at least one applications software package and optional associated data is held on a discrete, non-volatile memory device requiring no processing power, the memory device including means for releasable connection, by way of an I/O port, to a separate host computer having a processor and an operating system, and wherein, upon connection of the memory device to the computer, the applications software package runs from the memory device by making use of the operating system and processor of the host computer in such a way that changes to data as a result of data processing by the processor of the host computer are stored in the memory device, thus enabling the memory device to be disconnected at any time from the host computer without loss of data integrity and without requiring a dedicated shut-down procedure prior to disconnection, and to be reconnected to the same or a different host computer on a subsequent occasion in order to recommence data processing; and wherein
   the memory device includes an applications software package adapted to determine each time a data file is amended by a user, and automatically to send a copy of the amended data file to a predetermined repository, which may be at a remote location, thus providing an automatic audit function.

2. A discrete, non-volatile memory device requiring no on-board processor and having means for releasable connection by way of an I/O port to a host computer having a processor and an operating system, the memory device containing at least one applications software package and optional associated data, the applications software package being configured to run from the memory device, upon connection thereof to the host computer, by making use of the operating system and processor of the host computer, and wherein the memory device is configured to store changes to data resulting from data processing by the processor of the host computer, thus enabling the memory device to be disconnected at any time from the host computer without loss of data integrity and without requiring a dedicated shut-down procedure prior to disconnection, and to be reconnected to the same or a different host computer on a subsequent occasion in order to recommence data processing; and
   including an applications software package adapted to determine each time a data file is amended by a user, and automatically to send a copy of the amended data file to a predetermined repository, which may be at a remote location, thus providing an automatic audit function.

* * * * *